(No Model.)
E. D. HILL.
PROTECTOR FOR VINES AND FRUIT TREES.
No. 308,159. Patented Nov. 18, 1884.
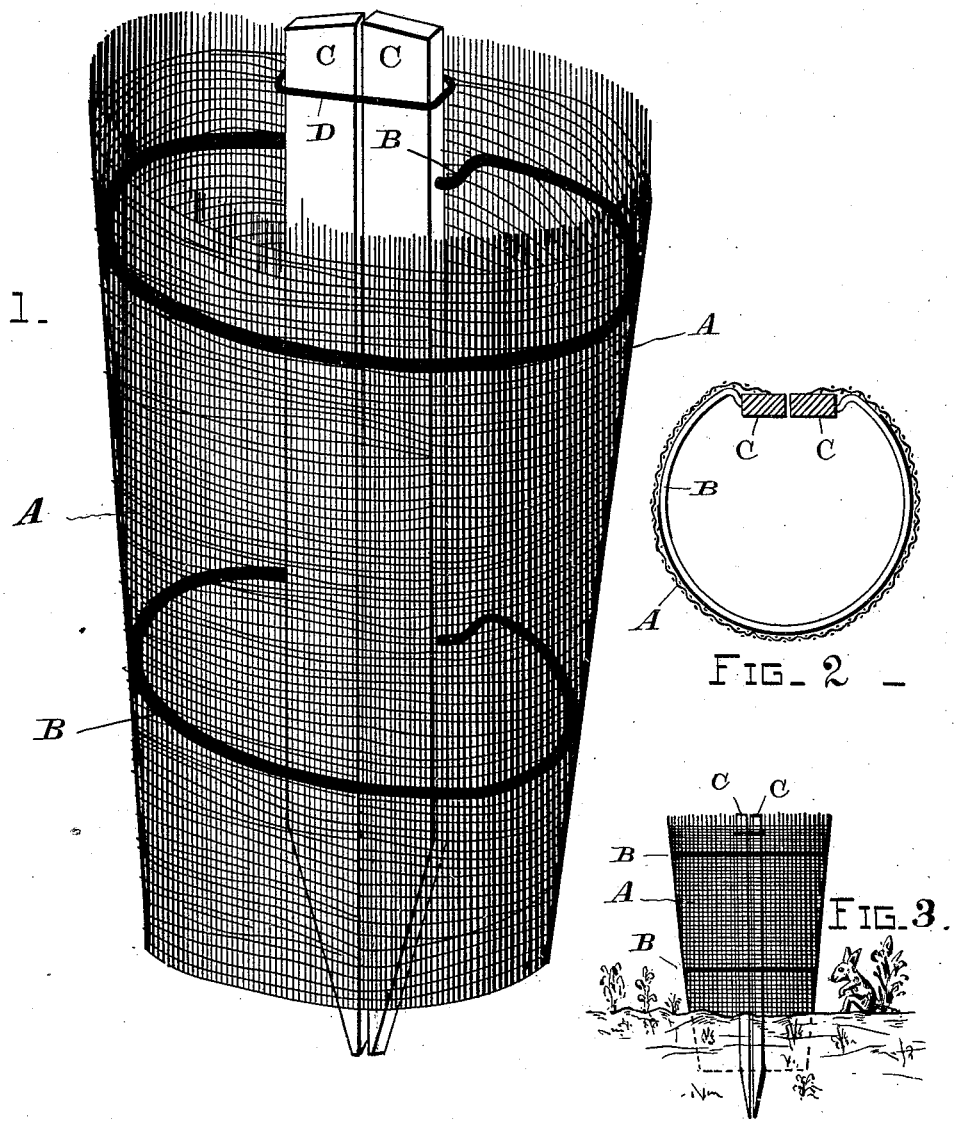
WITNESSES
Wilmer Bradford
Joseph Cooney
INVENTOR
Erwin D. Hill
By C. W. M. Smith
Attorney

UNITED STATES PATENT OFFICE.

ERWIN D. HILL, OF CAPELL VALLEY, CALIFORNIA, ASSIGNOR OF ONE-FOURTH TO ROBERT B. TUNSTALL, EDWIN J. TUNSTALL, AND JOHN H. OESTER, ALL OF SAME PLACE.

PROTECTOR FOR VINES AND FRUIT-TREES.

SPECIFICATION forming part of Letters Patent No. 308,159, dated November 18, 1884.

Application filed April 23, 1884. (No model.)

*To all whom it may concern:*

Be it known that I, ERWIN D. HILL, a citizen of the United States, residing at Capell Valley, in the county of Napa and State of California, have invented a new and useful Protector for Vines and Fruit-Trees, of which the following is a specification.

The objects of my invention are, first, to provide a means whereby the bark upon that portion of the body or stalk of vines and fruit-trees between the roots and branches thereof is protected from destruction by gophers, rabbits, and other animals or rodents; second, to provide a means whereby the bark upon young fruit-trees and vines is prevented from becoming blistered by the action of the sun's rays. I accomplish this object by the means illustrated in the accompanying drawings, in which—

Figure 1 is a perspective view of my improved tree and vine protector. Fig. 2 is a sectional top view of the same. Fig. 3 is an elevation showing the protector in position.

Similar letters of reference are used to indicate like parts throughout the several figures.

The body A of my protector I construct preferably of wire-cloth, as this open-meshed cloth will permit free circulation of air around the stalk or body of the tree or vine. The wire-work may be planished or plated with zinc. This meshing cloth is bent around springs B B, so as to form an oval or round basket or case a little larger at the top than at the bottom, and open at both ends. The ends of the wire springs enter two vertical stakes, C C, and the two ends of the wire-cloth are connected to the outer face of these stakes in any suitable manner by tacks or otherwise. The meeting edges of these stakes are on a longitudinal or vertical plane with each other from heads to points, and the outer edges of the points are beveled, so that when these stakes are driven into the earth the tendency will be to crowd or draw the meeting edges of the stakes and basket or protector together and hold the same in position without employing a latch or hook for that purpose.

In practice the protector is made of different sizes to suit the diameter of the vine or tree to which it is applied, and is sprung apart to receive the stalk or body of the tree between the two stakes, when the springs will draw the edges of the stakes together again into a vertical line, when the protector is driven into the earth, so as to carry down two or three inches of the lower edge of the wire netting or meshing.

The object of pressing the lower edge of the meshing below the surface of the earth is to prevent gophers from digging their way into the inclosure, as these rodents when in search of food only keep very near the surface, yet dig into the ground for a considerable depth when burrowing. A few of the horizontal strands of wire at the top of the gauze basket or casing are stripped out, leaving the sharp-pointed vertical strands exposed for a short distance, so as to form an abattis or spiked edging to prick and irritate the under part of the necks of such rodents or other animals who might reach over the top of the casing and, thrusting their heads therein, endeavor to eat the leaves and young twigs of the vine or tree.

In order to shelter and protect the body of the tree from the direct rays of the sun, I place the flat portion of the supporting-stakes upon the southwest side of the plant, in order that the said stakes may during that portion of the day when the rays of the sun are hottest cast a shadow over the tender plant and prevent scorching.

If deemed desirable, a loop of wire, D, may be slipped over the heads of the stakes C C, to bind them together and prevent the upper end of the basket from being spread apart.

Having thus described my invention, what I claim, and desire to secure by Letters Patent of the United States, is—

A tree and vine protector composed of a cylindrical wire-gauze tube, A, open at both ends, the horizontal spring-supports B B, the stakes C C, and connecting-loop D, all combined and arranged substantially as shown and described.

In testimony that I claim the foregoing I have hereunto set my hand and seal.

ERWIN D. HILL. [L. S.]

Witnesses:
WILMER BRADFORD,
WM. F. SMITH.